United States Patent
Ireland et al.

(10) Patent No.: US 9,732,261 B2
(45) Date of Patent: Aug. 15, 2017

(54) METHOD AND COMPOSITION FOR SEALING AND ASSEMBLING COMPONENTS OF A POWER TRAIN

(75) Inventors: Tania Ireland, Lyons (FR); Romain Sicre, Saint-Fons (FR)

(73) Assignee: BLUESTAR SILICONES FRANCE SAS (FR)

( * ) Notice: Subject to any disclaimer, the term of this patent is extended or adjusted under 35 U.S.C. 154(b) by 447 days.

(21) Appl. No.: 14/344,733

(22) PCT Filed: Sep. 13, 2012

(86) PCT No.: PCT/FR2012/000364
§ 371 (c)(1),
(2), (4) Date: Dec. 12, 2014

(87) PCT Pub. No.: WO2013/038076
PCT Pub. Date: Mar. 21, 2013

(65) Prior Publication Data
US 2015/0129127 A1    May 14, 2015

(30) Foreign Application Priority Data
Sep. 16, 2011 (FR) ..................... 11 02816

(51) Int. Cl.
*C09J 183/04* (2006.01)
*C08L 83/06* (2006.01)
*C08K 9/04* (2006.01)
*C09J 11/04* (2006.01)
C08K 3/26 (2006.01)
C08K 5/31 (2006.01)
C08K 5/544 (2006.01)

(52) U.S. Cl.
CPC ............... *C09J 183/04* (2013.01); *C08K 9/04* (2013.01); *C08L 83/06* (2013.01); *C09J 11/04* (2013.01); *C08K 3/26* (2013.01); *C08K 5/31* (2013.01); *C08K 5/544* (2013.01)

(58) Field of Classification Search
CPC ......... C08G 77/18; C07F 7/10; C07C 279/04; C07C 279/16
See application file for complete search history.

(56) References Cited

U.S. PATENT DOCUMENTS

| 6,235,832 B1 | 5/2001 | Deng et al. |
| 2010/0036034 A1 | 2/2010 | Araki et al. |
| 2012/0187633 A1* | 7/2012 | Maliverney ............ F02F 11/00 277/316 |

FOREIGN PATENT DOCUMENTS

| JP | 2010209269 A | 9/2010 |
| WO | 2010142872 A1 | 12/2010 |

OTHER PUBLICATIONS

International Search Report received in corresponding PCT/FR2012/000364 mailed Feb. 8, 2013.

* cited by examiner

*Primary Examiner* — Kuo-Liang Peng
(74) *Attorney, Agent, or Firm* — McBee Moore Woodward & Vanik IP, LLC

(57) ABSTRACT

The present invention relates to a cross-linkable, elastomeric silicone composition and to a method using the composition according to the invention to form seals for sealing and assembling components of a power train. The silicone elastomers prepared from the composition according to the invention have: good resistance to ageing in chemically aggressive fluids such as those used e.g. in a power train, in this case engine oils, gearbox and axle lubricants, oil/gasoline mixtures, coolants, fuels, or antifreeze; good adhesion properties, even to surfaces soiled by the oils used in a power train; and good mechanical-strength properties, such as breaking strength, elongation at break, and Shore hardness.

21 Claims, No Drawings

METHOD AND COMPOSITION FOR SEALING AND ASSEMBLING COMPONENTS OF A POWER TRAIN

CROSS REFERENCE TO RELATED APPLICATIONS

This application is a §371 National Stage Application of PCT/FR2012/000364, filed Sep. 13, 2012, which claims priority to FR 1102816, filed Sep. 16, 2011.

BACKGROUND

Field of the Invention

The subject of the present invention is a silicone composition which can be crosslinked to give an elastomer and a process using the composition according to the invention in order to form seals for sealing and assembling the components of a power train. The silicone elastomers prepared from the composition according to the invention exhibit:
- good resistance to ageing in chemically aggressive fluids, such as those used, for example, in a power train, in the case in point engine oils, gearbox and axle lubricants, oil/gasoline mixtures, coolants, fuel oils or antifreeze liquids,
- good adhesive properties, even on surfaces polluted by oils used in a power train, and
- good mechanical strength properties, such as breaking strength, elongation at break and Shore hardness.

Description of Related Art

The term "coolant" is intended to mean any heat-exchange liquid used to remove heat from a mechanical or electronic system.

Silicone compositions which can be crosslinked to give an elastomer in order to form gaskets are known. Specifically, they are suitable in particular for the formation of gaskets "in situ", which are formed directly during the assembly of the constituents, in particular in the motor vehicle field.

Among the silicone components which can be crosslinked to give an elastomer, known for this type of application, those which crosslink from ambient temperature form a category which attracts all the attention since they do not require the installation of an energy-consuming oven.

These silicone compositions are categorized into two distinct groups: one-component compositions (RTV-1) and two-component compositions (RTV-2). The term "RTV" is an acronym for "Room Temperature Vulcanizing".

During the crosslinking, water (either introduced by atmospheric moisture, in the case of RTV-1 compositions, or introduced into a portion of the composition in the case of RTV-2 compositions) enables the polycondensation reaction, which results in the formation of the elastomer network.

Generally, the one-component compositions (RTV-1) crosslink when they are exposed to atmospheric moisture. Most commonly, the kinetics of the polycondensation reactions are extremely slow; these reactions are thus catalyzed by an appropriate catalyst.

Furthermore, faced with a transportation industry which is changing fast, new constraints are emerging related to the increase in engine efficiencies, to the increase in operating temperatures, to the decrease in fuel consumption and to the decrease in the frequency of maintenance.

Thus, formulators of power train fluids (engine oil, gearbox and axle lubricant, oil/gasoline mixture, coolant, fuel oil or antifreeze liquid) continue to improve the performances of these products by the addition of ever more efficient additives. The amount of additives incorporated into these products increases ever more, thereby having the effect of increasing their chemical aggressiveness with regard to flexible members, for example gaskets, present in the devices in which these products are used.

Patent application JP-A-2009197188 describes silicone compositions having good resistance to contact with the various fluids used in a power train, but these compositions comprise complex and expensive crosslinkable oils which contain a $C_1$ to $C_5$ alkylene linking unit represented by the symbol Y in the following formulae:

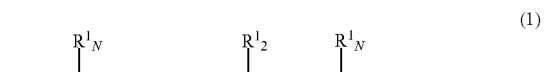

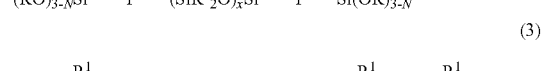

There is therefore an increasing need to find novel silicone compositions that are of use in forming seals for sealing and assembling the components of a power train, even on surfaces contaminated by oils.

SUMMARY

Thus, one of the essential objectives of the present invention is to provide novel organopolysiloxane compositions which cure to give a silicone elastomer in the presence of water or moisture, which are of use for sealing and assembling the constituents of a power train.

Another objective is to provide a novel process for sealing and assembling components of a power train by means of silicone seals having good resistance on contact with the various fluids used in a power train while having good adhesive properties.

These objectives, among others, are achieved by virtue of the present invention, which relates to a polyorganosiloxane composition X which can be crosslinked to give an elastomer in the presence of water via polycondensation reactions, comprising:

A) at least one polyorganosiloxane A comprising at least one alkoxylated group and composed of identical or different siloxyl units, of formula:

in which:
the symbol $Z=[—(OCH_2CH_2)_c—OR^5]$, with $c=0$ or 1, $a=0$, 1, 2 or 3; $b=0$, 1, 2 or 3, $a+b=0$, 1, 2 or 3,
the symbol $R^4$ represents a monovalent $C_1$ to $C_{13}$ hydrocarbon-based radical,
the symbol $R^5$ represents a monovalent $C_1$ to $C_6$ hydrocarbon-based radical or an alkoxyalkyl radical optionally comprising an ester function, and
with the condition that, for at least one siloxyl unit, the index $b \geq 1$, such that the polyorganosiloxane A contains at least one alkoxylated group Z, B) an amount strictly greater than 35% by weight, relative to the total amount of the composition, of at least one ground natural calcium carbonate B which has a specific surface area strictly less than 3 m²/g, measured according to the BET method, and which has been surface-treated with at least one compound chosen from the group consisting of: a paraffin, a fatty acid, a fatty acid salt, and a mixture thereof, C) a catalytically effective amount of at least one condensation catalyst C which is a guanidine that has an imine function substituted with an atom other than a hydrogen atom, D) at least one polyalkoxysilane D that has at least one group comprising at least one nitrogen atom, E) optionally at least one filler E other than said ground natural calcium carbonate B, F) optionally at least one additive F, such as a coloring base, a pigment or a thixotropic agent, and with the additional condition that said polyorganosiloxane composition X does not contain acetylene black.

DETAILED DESCRIPTION OF A PREFERRED EMBODIMENT

In order to achieve this objective, the applicant has, to its credit, demonstrated, surprisingly and unexpectedly, that the use of a judiciously chosen amount of a natural calcium carbonate having specific characteristics, in particular in terms of specific surface area and of surface treatment, combined with a catalyst of guanidine type and with a polyalkoxylated and aminated adhesion promoter, makes it possible to prepare seals which ensure the sealing and assembly of components or constituents used in a power train. These seals then have the advantage of having notable bonding properties, in particular in terms of cohesive profile, even on surfaces on which bonding is reputedly difficult, for instance aluminum supports contaminated by engine oils. Furthermore, the silicone elastomers prepared from the composition according to the invention have the advantage of maintaining good mechanical properties, even when they are in prolonged contact with chemically aggressive fluids, such as those used, for example, in a power train. As an example of chemically aggressive fluids, mention may be made, for example, of: engine oils, gearbox and axle lubricants, oil/gasoline mixtures, coolants, fuel oils and antifreeze liquids.

The ground natural calcium carbonate B according to the invention is prepared, for example, from chalk, calcite or marble or from a mixture thereof.

The term "natural calcium carbonate" is to be distinguished from a synthetic calcium carbonate obtained chemically, more well known as "precipitated calcium carbonate".

Preferably, the amount of ground natural calcium carbonate B added to the composition is between 37 and 50 parts by weight, relative to the total weight of the composition according to the invention.

Preferably, the ground natural calcium carbonate B has a specific surface area strictly less than 3 m²/g, measured according to the BET method, and has been surface treated with at least one fatty acid containing from 10 to 24 carbon atoms or its respective salt chosen from the calcium, magnesium or zinc salts, or a mixture thereof, and has preferably been surface-treated with a stearic acid or its respective calcium, magnesium or zinc salts.

Preferably, the crosslinkable polyorganosiloxane A is linear and has the expanded formula:

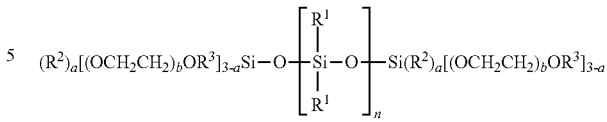

in which:
the substituents $R^1$, which may be identical or different, each represent a saturated or unsaturated monovalent $C_1$ to $C_{13}$ hydrocarbon-based radical which is substituted or unsubstituted and aliphatic, cyclanic or aromatic;

the substituents $R^2$, which may be identical or different, each represent a saturated or unsaturated monovalent $C_1$ to $C_{13}$ hydrocarbon-based radical which is substituted or unsubstituted and aliphatic, cyclanic or aromatic;

the substituents $R^3$, which may be identical or different, each represent a linear or branched $C_1$ to $C_6$ alkyl radical;

n has a value sufficient to confer, on the polyorganopolysiloxane of formula A, a dynamic viscosity at 25° C. ranging from 1 000 to 1 000 000 mPa·s; and the index a is equal to zero or 1 and the index b is equal to zero or 1.

According to another preferred embodiment, the polyorganosiloxane A comprising at least one alkoxylated group is obtained by reacting, optionally in situ, in the presence of a catalytically effective amount of at least one functionalization catalyst G:

a) at least one polyorganosiloxane A' comprising siloxyl units of formula:

in which:
x+y=0, 1, 2 or 3;
the substituents $R^1$, which can be identical or different, each represent a monovalent $C_1$ to $C_{30}$ hydrocarbon-based radical chosen from the group consisting of alkyl, cycloalkyl, aryl, alkaryl and aralkyl radicals, and at least two siloxyl units comprising an ≡SiOH group are present in the polyorganosiloxane A', with b) at least one polyalkoxylated silane H of formula:

in which:
z=0 or 1,
the symbol $R^2$ represents a monovalent $C_1$ to $C_{13}$ hydrocarbon-based radical, and
the symbols $R^3$ which may be identical or different, each represent a monovalent $C_1$ to $C_6$ hydrocarbon-based radical or an alkoxyalkyl radical optionally having an ester function.

Preferably, the functionalization catalyst G is lithium hydroxide or potassium hydroxide. Lithium hydroxide is widely commercially available. It is preferably used in solution in an alcohol, for instance methanol or ethanol.

The preparation of polyorganosiloxane comprising alkoxylated groups by functionalization is described, for example, in French patent application No. FR2638752-A1.

According to another preferred embodiment, the polyorganosiloxane A' is preferably an α,ω-dihydroxypolydiorganosiloxane polymer, with a viscosity between 50 and 5 000 000 mPa·s at 25° C.

Examples of polyalkoxysilane D having at least one group comprising at least one nitrogen atom are, for example, those of formula (6) below:

$$(R^5)_z Si(OR^4)_{(4-z)} \quad (6)$$

in which:
z=1 or 2,
the symbol $R^5$ represents a group or radical comprising at least one nitrogen atom, and
the symbols $R^4$, which may be identical or different, each represent a monovalent $C_1$ to $C_6$ hydrocarbon-based radical or an alkoxyalkyl radical optionally having an ester function.

As examples of polyalkoxysilane D having at least one group comprising at least one nitrogen atom of use according to the invention, mention may be made of the following compounds:

[H$_2$N(CH$_2$)$_3$]Si(OCH$_2$CH$_2$CH$_3$)$_3$, [H$_2$N(CH$_2$)$_3$]Si)OCH$_3$)$_3$

[H$_2$N(CH$_2$)$_3$]Si(OC$_2$H$_5$)$_3$  [H$_2$N(CH$_2$)$_4$]Si(OCH$_3$)$_3$

[H$_2$NCH$_2$CH(CH$_3$)CH$_2$CH$_2$]SiCH$_3$(OCH$_3$)$_2$

[H$_2$NCH$_2$]Si(OCH$_3$)$_3$  [n-C$_4$H$_9$—HN—CH$_2$]Si(OCH$_3$)$_3$

[H$_2$N(CH$_2$)$_2$NH(CH$_2$)$_3$]Si(OCH$_3$)$_3$

[H$_2$N(CH$_2$)$_2$NH(CH$_2$)$_3$]Si(OCH2CH$_2$OCH$_3$)$_3$

[CH$_3$NH(CH$_2$)$_2$NH(CH$_2$)$_3$]Si(OCH$_3$)$_3$

[H(NHCH$_2$CH$_2$)$_2$NH(CH$_2$)$_3$]Si(OCH$_3$)$_3$  HS(CH$_2$)$_3$Si(OCH$_3$)$_3$

NH2CONH2(CH$_2$)$_3$Si(OCH$_3$)$_3$

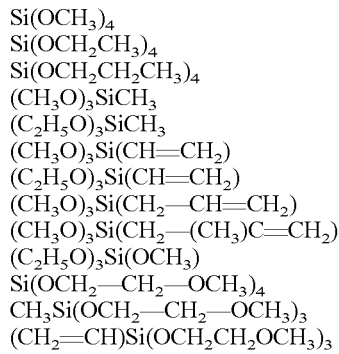

Preferably, the polyalkoxysilane D will be present in the composition in amounts of between 0.1 and 5 parts by weight, relative to the total weight of the composition.

It is understood that conventional adhesion promoters can also be added to the composition according to the invention, such as polyalkoxylated silanes H other than the polyalkoxysilane D. These are products that are available on the silicone market; furthermore, their use in compositions which cure from ambient temperature is known: it appears in particular in French patents FR-A-1 126 411, FR-A-1 179 969, FR-A-1 189 216, FR-A-1 198 749, FR-A-1 248 826, FR-A-1 314 649, FR-A-1 423 477, FR-A-1 432 799 and FR-A-2 067 636.

An examples of polyalkoxylated silanes H, mention may be made of those of formula:
Si(OCH$_3$)$_4$
Si(OCH$_2$CH$_3$)$_4$
Si(OCH$_2$CH$_2$CH$_3$)$_4$
(CH$_3$O)$_3$SiCH$_3$
(C$_2$H$_5$O)$_3$SiCH$_3$
(CH$_3$O)$_3$Si(CH=CH$_2$)
(C$_2$H$_5$O)$_3$Si(CH=CH$_2$)
(CH$_3$O)$_3$Si(CH$_2$—CH=CH$_2$)
(CH$_3$O)$_3$Si(CH$_2$—(CH$_3$)C=CH$_2$)
(C$_2$H$_5$O)$_3$Si(OCH$_3$)
Si(OCH$_2$—CH$_2$—OCH$_3$)$_4$
CH$_3$Si(OCH$_2$—CH$_2$—OCH$_3$)$_3$
(CH$_2$=CH)Si(OCH$_2$CH$_2$OCH$_3$)$_3$
C$_6$H$_5$Si(OCH$_3$)$_3$
C$_6$H$_5$Si(OCH$_2$—CH$_2$—OCH$_3$)$_3$
3-glycidoxypropyltrimethoxysilane (GLYMO), and methacryloxypropyltrimethoxysilane (MEMO).

The objective of the introduction of a filler E is to confer, where necessary, good mechanical and rheological characteristics on the elastomers resulting from the curing of the compositions in accordance with the invention. Use is made, for example, of very finely divided inorganic fillers, the mean particle diameter of which is less than 0.1 µm. Among these fillers are fumed silicas and precipitated silicas; their BET specific surface area is generally greater than 40 m²/g. These fillers can also be in the form of more coarsely divided products, with a mean particle diameter of greater than 0.1 µm. As examples of such fillers, mention may be made of ground quartz, diatomaceous silicas, a calcium carbonate other than said ground natural calcium carbonate B, it being possible for said calcium carbonate to be optionally surface-treated with an organic acid or with an ester of an organic acid, calcined clay, titanium oxide of the rutile type, iron, zinc, chromium, zirconium or magnesium oxides, the various forms of alumina (hydrated or nonhydrated), boron nitride, lithopone, barium metaborate, barium sulfate, and glass microbeads; their specific surface area is generally less than 30 m²/g. These fillers may have been surface-modified by treatment with the various organosilicon compounds normally employed for this use. Thus, these organosilicon compounds can be organochlorosilanes, diorganocyclopolysiloxanes, hexaorganodisiloxanes, hexaorganodisilazanes or diorganocyclopolysilazanes (French patents FR-A-1 126 884, FR-A-1 136 885, FR-A-1 236 505 and British patent GB-A-1 024 234). The treated fillers contain, in most cases, from 3% to 30% of their weight of organosilicon compounds. The fillers can consist of a mixture of several types of fillers of different particle size; thus, for example, they can consist of from 30% to 70% of finely divided silicas with a BET specific surface area greater than 40 m²/g and from 70% to 30% of more coarsely divided silicas with a specific surface area of less than 30 m²/g. These fillers may have been surface treated. Preferably, from 0.1 to 10 parts by weight of this filler E, relative to the total weight of the composition, will be added.

The condensation catalyst C according to the invention is a guanidine which has an imine function substituted with an atom other than a hydrogen atom. The term "substituted imine" is intended to mean a function >C=N—R with R being other than a hydrogen atom. The condensation catalyst C according to the invention is added to the composition in amounts generally of between 0.1 and 5 parts by weight relative to the total weight of the composition, and more preferentially between 0.1 and 1 part by weight relative to the total weight of the composition.

According to one preferred embodiment, the condensation catalyst C is a guanidine corresponding to general formula (I):

in which:
- the $R^1$ radicals, which may be identical or different, represent, independently of one another, a linear or branched monovalent alkyl group, a cycloalkyl group, a (cycloalkyl)alkyl group, the ring being substituted or unsubstituted and possibly comprising at least one heteroatom or a fluoroalkyl group,
- the $R^2$ radical represents a hydrogen atom, a linear or branched monovalent alkyl group, a cycloalkyl group, an alkyl group substituted with a ring, which is substituted or unsubstituted and which can comprise at least one heteroatom, an aromatic group, an arylalkyl group, a fluoroalkyl group, an alkylamine group or an alkylguanidine group, and
- the $R^3$ radical represents a linear or branched monovalent alkyl group, a cycloalkyl group, an alkyl group substituted with a ring, which is substituted or unsubstituted and which can comprise at least one heteroatom, or an arylalkyl, fluoroalkyl, alkylamine or alkylguanidine group,
- when the $R^2$ radical is not a hydrogen atom, the $R^2$ and $R^3$ radicals can be linked up to form a 3-, 4-, 5-, 6- or 7-membered aliphatic ring optionally substituted with one or more substituents.

They are 1,2,3-trisubstituted and 1,2,3,3-tetrasubstituted guanidines and they have the advantage of being liquid, colorless, odorless and soluble in silicone matrices. Examples of catalysts of this type are described in international patent application WO2009/118307.

Use will preferably be made of the following catalysts (A1) to (A6):

(A1)
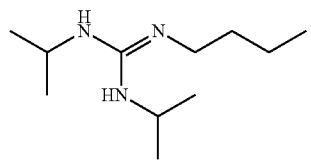

(A2)
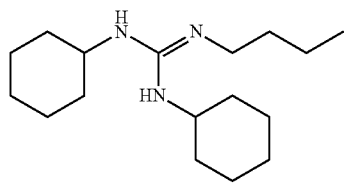

(A3)
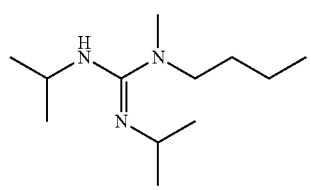

(A4)
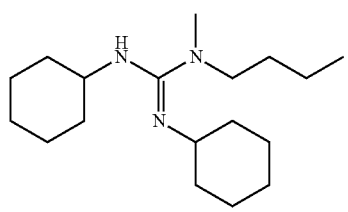

(A5)
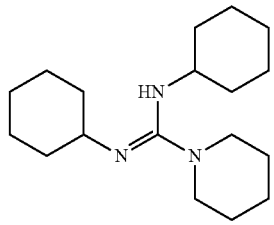

(A6)
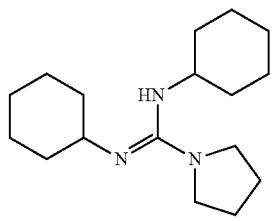

According to another preferred embodiment, the condensation catalyst C is a guanidine of formula:

(II)
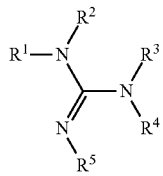

in which:
- the $R^1$, $R^2$, $R^3$, $R^4$ or $R^5$ radicals, which may be identical or different, represent, independently of one another, a linear or branched monovalent alkyl group, a cycloalkyl group, a (cycloalkyl)alkyl group, the ring being substituted or unsubstituted and possibly comprising at least one heteroatom or a fluoroalkyl group, an aromatic group, an arylalkyl group, a fluoroalkyl group, an alkylamine group or an alkylguanidine group, and
- the $R^1$, $R^2$, $R^3$ or $R^4$ radicals can be linked up in pairs so as to form a 3-, 4-, 5-, 6- or 7-membered aliphatic ring optionally substituted with one or more substituents.

These are pentasubstituted guanidines and they have the advantage of being liquid, colorless, odorless and soluble in silicone matrices.

According to one particular embodiment, the following compounds (A7) to (A9) are preferred:

(A7)
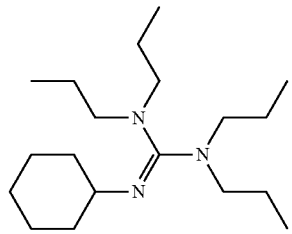

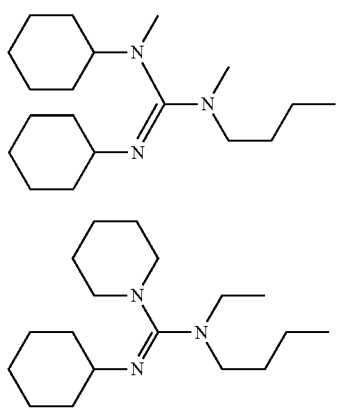

They are, for example, described in French patent application No. FR-0806610 filed on Nov. 25, 2008.

As an example of a thixotropic agent, mention may be made of:
- inorganic thickeners, boric acid and borates, titanates, aluminates or zirconates;
- compounds carrying hydroxyl groups;
- compounds based on polyethylene and/or polypropylene;
- compounds comprising cyclic amine functions;
- compounds of polyether type or comprising polyether groups, and
- fluororesins, preferably based on polyfluoroethylene (PFE) and even more preferentially based on polytetrafluoroethylene (PTFE or Teflon®).

Another subject of the invention relates to an elastomer obtained by crosslinking, in the presence of water, of the polyorganosiloxane composition X according to the invention and as defined above.

Another subject of the invention relates to the use of the polyorganosiloxane composition X according to the invention and as defined above, or of the elastomer according to the invention and as defined above, for preparing silicone gaskets having good adhesion on surfaces contaminated by oils of a power train.

Finally, the last subject according to the invention relates to a process for sealing and assembling at least one component of a power train, comprising the following steps a) to d):
a) a polyorganosiloxane composition X according to the invention and as defined above is prepared,
b) said polyorganosiloxane composition X is applied to at least one contact region of said component continuously or noncontinuously and optionally in the form of a bead,
c) said polyorganosiloxane composition X is allowed to crosslink to form a silicone elastomer in the presence of moisture provided by the ambient air or by prior addition of water, so as to form a gasket, and
d) said component is assembled with another component of the power train such that the seal formed provides for the assembly and the sealing between the two components of the power train.

In the motor vehicle field, silicone elastomers are often used in the form of silicone seals. The term "silicone seals" encompasses several types of gaskets, namely "flowed" seals (FSs), also known as flattened seals, and profiled seals (PSs), also known as "shaped seals".

The "flowed" seals (FSs) are generally formed following the application of a pasty bead of the compositions to the region of contact between two metal or plastic constituents to be assembled. The pasty bead is first deposited on one of the constituents and then the other constituent is applied to the first; this results in flattening of the bead before it is converted into elastomer. Seals of this type are aimed at assemblages which do not have to be commonly taken apart (oil sump seals, timing case seals, etc.).

The "profiled" seals (PSs) are particularly used in the transportation and motor vehicle sector for sealing applications on all engine parts which must be able to to be taken apart, such as, for example, the cylinder head cover, oil pump, water pump, water tank, oil sump, timing case or clutch guide. The "profiled" seals (PSs) are generally formed following the application of a pasty bead of the compositions to the region of contact between two constituents to be assembled. However, after the deposition of the pasty bead on one of the constituents, the bead is allowed to crosslink to form elastomer and then the second constituent is applied to the first. The result of this is that such an assemblage can be easily taken apart since the constituent which is applied to that which has received the seal does not adhere to this seal. Moreover, the seal, by virtue of its elastomeric nature, matches the irregularities of the surfaces which are to have seals formed on them. As a result, it is pointless to carefully machine the surfaces which have to be brought into contact with one another and to forcibly tighten the assemblages obtained. These particularities make it possible to dispense to a certain extent with fastening seals, spacers or ribs usually intended to stiffen and reinforce the constituents of the assemblages. The "profiled seal" is generally a closed bead of silicone elastomer with an ovoid cross section which is deposited according to a well-defined profile and which has to provide for the sealing of two (or more) parts which can be taken apart.

As the compositions used in the process of the invention cure rapidly at ambient temperature and even in an enclosed environment, the result of this is that the silicone gaskets resulting from the curing of these compositions can be prepared under highly restrictive industrial manufacturing conditions. They can, for example, be manufactured on the normal assembly lines of the motor vehicle industry, equipped with an automatic device for the deposition of the compositions. This automatic device very often has a mixing head and a depositing nozzle, the latter moving along according to the outline of the seals to be manufactured. The compositions manufactured and distributed by means of this device preferably have a curing time which is properly adjusted in order, on the one hand, to avoid the compositions setting solid in the mixing head and, on the other hand, to obtain complete crosslinking after the end of the deposition of the pasty bead on the parts on which seals are to be formed. These "shaped" seals are more especially suitable for cylinder head cover seals, gearbox case cover seals, timing spacer seals and even oil sump seals.

The component can be of diverse and varied nature and made of glass, aluminum, plastic or metal.

According to another particular embodiment of the process according to the invention, the component of the power train is chosen from the group consisting of: a cylinder head, an oil sump, a cylinder head cover, a timing case, a bearing bar, an engine cylinder block, a gearbox, a water pump, a positive crankcase ventilation box, a water filter, an oil filter, an oil pump, a housing comprising electronic components of a power train or a clutch housing.

Generally, the silicone composition is applied to the component either in the form of a continuous or noncontinuous seal or in the form of a continuous or noncontinuous layer. Use may be made of conventional deposition or coating techniques in order to form a continuous or discontinuous layer.

After the deposition of the compositions as is on solid substrates, in a humid atmosphere, it is noted that a process for curing to give elastomer takes place; it is carried out from the outside to the inside of the mass deposited. A skin is first formed at the surface and then the crosslinking is continued deep inside. The complete formation of the skin, which is reflected by a nontacky feel of the surface, requires a period of a time of a few minutes; this period depending on the relative humidity of the atmosphere surrounding the compositions and on the ease of crosslinking of said compositions.

One-component bases are described in detail, for example, in patents EP 141 685, EP 147 323, EP 102 268, EP 21 859, FR 2 121 289 and FR 2 121 631, cited by way of reference.

Other advantages and characteristics of the present invention will become apparent on reading the following examples, given by way of illustration without any implied limitation.

EXAMPLES

I) Components of the Various Formulations

Catalyst 51015: solution of lithium hydroxide hydrate in methanol
VTMO: vinyltrimethoxysilane
MEMO: γ-methacryloxypropyltrimethoxysilane
DAMO: N-β-(aminoethyl)-γ-aminopropyltrimethoxysilane
AMEO: 3-aminopropyltriethoxysilane
Tyzor® PITA: (iPrO)$_2$Ti(ethyl acetoacetate)$_2$ (supplier Dupont)
Tyzor® PITA SM: mixture of 80% of (iPrO)$_2$Ti(ethyl acetoacetate)$_2$ and of 20% of methyltrimethoxysilane (supplier Dupont)
TnBT: tetrabutoxytitanate
Silica A150: fumed silica (specific surface area 150 m$^2$/g)
Silica AE55: fumed silica treated with octamethyltetrasiloxane
BLR®3: ground calcium carbonate treated with a fatty acid (supplier Omya)
Omyabond® 520FL: ground calcium carbonate treated with a fatty acid (stearic acid, supplier Omya)
Hakuenka® CCRS: fatty acid-treated precipitated calcium carbonate (supplier Shiraishi)
Sifraco or Sikron® C600: ground quartz (supplier Sibelco)
Products prepared DiCyG: N,N-dicyclohexyl-N'-methyl-N''-butylguanidine or 1-butyl-2,3-dicyclohexyl-1-methylguanidine:

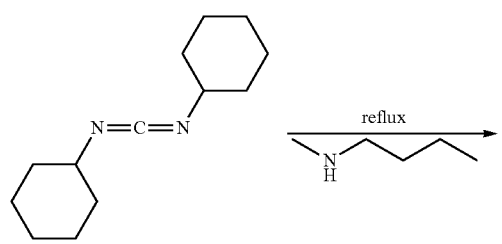

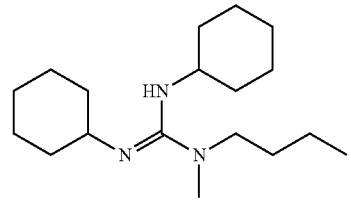

A mixture of 17.78 g of N-butyl-N-methylamine (0.204 mol) and 21.05 g of dicyclohexylcarbodiimide (0.102 mol) is heated at reflux for 3 h. GC analysis then shows a conversion of the dicyclohexylcarbodiimide of greater than 99.5%. The colorless final mixture is concentrated at 60° C. under 1 mbar for 2 h to give 29.9 g of a colorless, virtually odorless and moderately viscose liquid corresponding to the expected guanidine (yield 99.7%).

$^1$H NMR/CDCl$_3$ (ppm): 0.89 (3H, t), 1-1.4 (10H, m), 1.47 (2H, quint), 1.5-2 (12H, several m), 2.67 (3H, s), 2.90 (1H, m), 2.97 (1H, m), 3.06 (2H, t).

II) Nature of the Bulking Filler

The influence of the nature of the bulking filler was studied. The following table gives the characteristics of the various bulking fillers used. The specific surface area is measured by the BET method.

TABLE 1

Characteristics of the various bulking fillers used

| Bulking filler | Nature of filler | Treatment | Specific surface area (m$^2$/g) | D50 (µm) |
|---|---|---|---|---|
| BLR ®3 | ground natural CaCO$_3$ | fatty acid | 2 | 6.5 |
| Omyabond ® 520FL | ground natural CaCO$_3$ | fatty acid | 2 | 2 |
| Hakuenka ® CCRS | precipitated CaCO$_3$ | fatty acid | 15-17 | 0.08 |
| Sikron ® C600 | ground quartz | untreated | 1.8 | 1.8 |

Example 1

620 g of α,ω-dihydroxylated polydimethylsiloxane oil, containing 0.06% by weight of hydroxyl OH groups, and 48 g of vinyltrimethoxysilane are introduced into a mixer equipped with a stirrer of "butterfly" type. This mixture is homogenized by rotating the "butterfly" at 200 rpm for 2 minutes. The functionalization catalyst, 2.4 g of a methanolic solution of lithium hydroxide hydrate, is then added, followed by a phase of homogenization at 400 rpm. 36 g of octamethyltetracyclosiloxane-treated fumed silica are then incorporated at a moderate stirring speed of 160 rpm and then dispersed for 4 minutes at 400 rpm. Likewise, 480 g of BLR®3 calcium carbonate are incorporated. The medium is then subjected to a phase of degassing under a partial vacuum of 50 mbar and with stirring at 130 rpm, then 6 g of N-β-(aminoethyl)-γ-aminopropyltrimethoxysilane and 7.2 g of N,N-dicyclohexyl-N'-methyl-N''-butylguanidine are added under nitrogen and dispersed at 400 rpm. The medium is subjected to a second phase of degassing under 40 mbar and with stirring at 130 rpm. Finally, the mixture is transferred into closed plastic cartridges, away from atmospheric moisture.

Example 2

620 g of α-ω-dihydroxylated polydimethylsiloxane oil, containing 0.06% by weight of hydroxyl OH groups, and 48 g of vinyltrimethoxysilane are introduced into a mixer equipped with a stirrer of "butterfly" type. This mixture is homogenized by rotating the "butterfly" at 200 rpm for 2 minutes. The functionalization catalyst, 2.4 g of a methanolic solution of lithium hydroxide hydrate, is then added, followed by a phase of homogenizing at 400 rpm. 36 g of octamethyltetracyclosiloxane-treated fumed silica are then incorporated at a moderate stirring speed of 160 rpm and then dispersed for 4 minutes at 400 rpm. Likewise, 480 g of Omyabond® 520FL calcium carbonate are incorporated. The medium is then subjected to a phase of degassing under a partial vacuum of 50 mbar and with stirring at 130 rpm, and then 6 g of N-β-(aminoethyl)-γ-aminopropyltrimethoxysilane and 7.2 g of N,N-dicyclohexyl-N'-methyl-N''-butylguanidine are added under nitrogen and dispersed at 400 rpm. The medium is subjected to a second phase of degassing under 40 mbar and with stirring at 130 rpm. Finally, the mixture is transferred into closed plastic cartridges, away from atmospheric moisture.

Counterexample 1

620 g of α-ω-dihydroxylated polydimethylsiloxane oil, containing 0.06% by weight of hydroxyl OH groups, and 48 g of vinyltrimethoxysilane are introduced into a mixer equipped with a stirrer of "butterfly" type. This mixture is homogenized by rotating the "butterfly" at 200 rpm for 2 minutes. The functionalization catalyst, 2.4 g of a methanolic solution of lithium hydroxide hydrate, is then added, followed by a phase of homogenizing at 400 rpm. 36 g of octamethyltetracyclosiloxane-treated fumed silica are then incorporated at a moderate stirring speed of 160 rpm and then dispersed for 4 minutes at 400 rpm. Likewise, 480 g of Hakuenka® CCRS calcium carbonate are incorporated. The medium is then subjected to a phase of degassing under a partial vacuum of 50 mbar and with stirring at 130 rpm, and then 6 g of N-β-(aminoethyl)-γ-aminopropyltrimethoxysilane and 7.2 g of N,N-dicyclohexyl-N'-methyl-N''-butylguanidine are added under nitrogen and dispersed at 400 rpm. The medium is subjected to a second phase of degassing under 40 mbar and with stirring at 130 rpm. Finally, the mixture is transferred into closed plastic cartridges, away from ambient moisture.

Counterexample 2

620 g of α-ω-dihydroxylated polydimethylsiloxane oil, containing 0.06% by weight of hydroxyl OH groups, and 48 g of vinyltrimethoxysilane are introduced into a mixer equipped with a stirrer of "butterfly" type. This mixture is homogenized by rotating the "butterfly" at 200 rpm for 2 minutes. The functionalization catalyst, 2.4 g of a methanolic solution of lithium hydroxide hydrate, is then added, followed by a phase of homogenizing at 400 rpm. 36 g of octamethyltetracyclosiloxane-treated fumed silica are then incorporated at a moderate stirring speed of 160 rpm and then dispersed for 4 minutes at 400 rpm. Likewise, 480 g of Sikron® C600 ground quartz are incorporated. The medium is then subjected to a phase of degassing under a partial vacuum of 50 mbar and with stirring at 130 rpm, and then 6 g of N-β-(aminoethyl)-γ-aminopropyltrimethoxysilane and 7.2 g of N,N-dicyclohexyl-N'-methyl-N''-butylguanidine are added under nitrogen and dispersed at 400 rpm. The medium is subjected to a second phase of degassing under 40 mbar and with stirring at 130 rpm. Finally, the mixture is transferred into closed plastic cartridges, away from ambient moisture.

The properties of each of the formulations prepared are evaluated in the following way.

Evaluation of the Mechanical Properties of the Products

Seals in the form of films 2 mm thick are crosslinked beforehand at 23° C. and 50% relative humidity for 7 days. Test specimens are then cut out from the film in order to measure the mechanical properties of the elastomer formed.

- The Shore A hardness (SAH) is measured using three superposed squares 2 mm thick, according to standard DIN 53505,
- The breaking strength (BS) in MPa is measured using H2 test specimens according to the standard AFNOR NF T 46002, as are the % elongation at break (E/B) and the elastic modulus (modulus at 100%) in MPa.

Test for Evaluation of the Adhesive Properties by Tensile-Shear Stress

A parallelepipedal seal of silicone elastomer 1 mm thick is applied between two AG3 aluminum test strips. The test specimen thus obtained after crosslinking at 23° C.+/−2 and 50%+/−5 relative humidity for 14 days is subjected to a tensile-shear stress. The adhesive bonding is characterized by the tensile strength (MPa) and the type of break (% percentage of cohesive profile). A high cohesive profile break is sought. The test specimens of aluminum of AluAG3 quality are scraped beforehand in order to remove the oxide layer and then cleaned with solvent and dried.

For the evaluation of the adhesive properties on AluAG3 contaminated with engine oil, the test strips are dipped, before application of the silicone seal, in a solution of engine oil in heptane, and then removed and air-dried until a thin film of residual oil is obtained at the site of application. The adhesive bonding is again characterized by the tensile strength (MPa) and the type of break (% percentage of cohesive profile). A high cohesive profile break is sought.

Evaluation of the Resistance to Engine Oils

Seals in the form of films 2 mm thick are crosslinked beforehand at 23° C. and 50% relative humidity for 14 days. Square test specimens and H2 test specimens are then cut out from the film in order to measure the mechanical properties of the elastomer formed. The test specimens are then placed in a flask and immersed in Elf diesel Evolution 5W30 engine oil. The flasks are then stored at 150° C. for 3 days. After cooling, the test specimens are removed and carefully wiped with a paper cloth and the following are then measured:

- the Shore A hardness (SAH) using three superposed squares 2 mm thick, according to the standard DIN 53505,
- the breaking strength (BS) in MPa using H2 test specimens according to the standard AFNOR NF T 46002, and also the % elongation at break (E/B) and the elastic modulus (modulus at 100%) in MPa,
- the swelling, by weighing before and after treatment in the oil, with swelling (%)=100×($m^{oil}$−$m^{initial}$)/($m^{initial}$).

The following table 2 gives the properties measured for each of the formulations prepared.

TABLE 2

Influence of the nature of the bulking filler on the adhesive properties of alkoxy RTV1 formulations

| Fillers (% by weight) | Example 1 according to the invention | Example 2 according to the invention | Counter-example 1 | Counter-example 2 |
|---|---|---|---|---|
| AE55 | 3 | 3 | 3 | 3 |
| BLR ®3 | 40 | | | |
| Omyabond ® 520FL | | 40 | | |
| Hakuenka ® CCRS | | | 40 | |
| Sikron ® C600 | | | | 40 |
| Mechanical properties after 7 d of cross-linking at 23° C. +/− 2 and 50% RH +/− 5 | | | | |
| Shore A hardness | 37 | 38 | 52 | 48 |
| BS (MPa) | 1.15 | 1.89 | 3.15 | 3.86 |
| E/B (%) | 226 | 302 | 290 | 266 |
| M100 (MPa) | 0.91 | 0.99 | 1.56 | 1.88 |
| Mechanical properties after treatment in Elf diesel evolution 5W30 oil for 3 d at 150° C. | | | | |
| Shore A hardness | 20 | 19 | 29 | 17 |
| BS (MPa) | 0.74 | 1.0 | 2.4 | 1.26 |
| E/B (%) | 247 | 283 | 305 | 320 |
| M100 (MPa) | 0.44 | 0.47 | 0.95 | 0.47 |
| Properties of adhesive bondings 1 mm thick in tensile-shear stress on Alu AG3 not contaminated with oil | | | | |
| BS (MPa) | 0.6 | 0.8 | 1.1 | 1.5 |
| Cohesion (%) | 100 | 97 | 63 | 98 |
| Properties of adhesive bondings 1 mm thick in tensile-shear stress on Alu AG3 contaminated with oil | | | | |
| BS (MPa) | 0.6 | 0.8 | 0.6 | 0.7 |
| Cohesion (%) | 83 | 40 | 0 | 0 |

Only the formulations containing calcium carbonate according to the invention (examples 1 and 2) make it possible to obtain a cohesive profile on AG3 aluminum contained with engine oil.

III) Content of Ground Natural Calcium Carbonate B According to the Invention The influence of the content of the bulking filler according to the invention (ground natural calcium carbonate B) was studied.

Example 3

560 g of α-ω-dihydroxylated polydimethylsiloxane oil, containing 0.06% by weight of hydroxyl OH groups, and 48 g of vinyltrimethoxysilane are introduced into a mixer equipped with a stirrer of "butterfly" type. This mixture is homogenized by rotating the "butterfly" at 200 rpm for 2 minutes. The functionalization catalyst, 2.4 g of a methanolic solution of lithium hydroxide hydrate, is then added, followed by a phase of homogenizing at 400 rpm. 36 g of fumed silica are then incorporated at a moderate stirring speed of 160 rpm and then dispersed for 4 minutes at 400 rpm. Likewise, 540 g of BLR®3 calcium carbonate are incorporated. The medium is then subjected to a phase of degassing under a partial vacuum of 50 mbar and with stirring at 130 rpm, and then 6 g of N-β-(aminoethyl)-γ-aminopropyltrimethoxysilane and 7.2 g of N,N-dicyclohexyl-N'-methyl-N''-butylguanidine are added under nitrogen and dispersed at 400 rpm. The medium is subjected to a second phase of degassing under 40 mbar and with stirring at 130 rpm. Finally, the mixture is transferred into closed plastic cartridges, away from ambient moisture.

Counterexample 3

746 g of α-ω-dihydroxylated polydimethylsiloxane oil, containing 0.06% by weight of hydroxyl OH groups, and 48 g of vinyltrimethoxysilane are introduced into a mixer equipped with a stirrer of "butterfly" type. This mixture is homogenized by rotating the "butterfly" at 200 rpm for 2 minutes. The functionalization catalyst, 2.4 g of a methanolic solution of lithium hydroxide hydrate, is then added, followed by a phase of homogenizing at 400 rpm. 96 g of fumed silica are then incorporated at a moderate stirring speed of 160 rpm and then dispersed for 4 minutes at 400 rpm. Likewise, 300 g of BLR®3 calcium carbonate are incorporated. The medium is then subjected to a phase of degassing under a partial vacuum of 50 mbar and with stirring at 130 rpm, and then 6 g of N-β-(aminoethyl)-γ-aminopropyltrimethoxysilane and 3.6 g of N,N-dicyclohexyl-N'-methyl-N''-butylguanidine are added under nitrogen and dispersed at 400 rpm. The medium is subjected to a second phase of degassing under 40 mbar and with stirring at 130 rpm. Finally, the mixture is transferred into closed plastic cartridges, away from ambient moisture.

Counterexample 4

650 g of α-ω-dihydroxylated polydimethylsiloxane oil, containing 0.06% by weight of hydroxyl OH groups, and 48 g of vinyltrimethoxysilane are introduced into a mixer equipped with a stirrer of "butterfly" type. This mixture is homogenized by rotating the "butterfly" at 200 rpm for 2 minutes. The functionalization catalyst, 2.4 g of a methanolic solution of lithium hydroxide hydrate, is then added, followed by a phase of homogenizing at 400 rpm. 66 g of fumed silica are then incorporated at a moderate stirring speed of 160 rpm and then dispersed for 4 minutes at 400 rpm. Likewise, 420 g of BLR®3 calcium carbonate are incorporated. The medium is then subjected to a phase of degassing under a partial vacuum of 50 mbar and with stirring at 130 rpm, and then 6 g of N-β-(aminoethyl)-γ-aminopropyltrimethoxysilane and 7.2 g of N,N-dicyclohexyl-N'-methyl-N''-butylguanidine are added under nitrogen and dispersed at 400 rpm. The medium is subjected to a second phase of degassing under 40 mbar and with stirring at 130 rpm. Finally, the mixture is transferred into closed plastic cartridges, away from ambient moisture.

The following table shows the properties measured for each of the formulations prepared according to the evaluation tests described above.

TABLE 3

Influence of the filler content on the adhesive properties of the alkoxy RTV1 formulations

| Fillers (% by weight) | Counter-example 3 | Counter-example 4 | Example 3 according to the invention | Example 1 according to the invention |
|---|---|---|---|---|
| Silica A150 | 8 | 3.5 | 3 | |
| Silica AE55 | | | | 3 |
| BLR ®3 | 25 | 35 | 45 | 40 |
| Mechanical properties after 7 d of cross-linking at 23° C. +/− 2 and 50% RH +/− 5 | | | | |
| Shore A hardness | 48 | 42 | 42 | 37 |
| BS (MPa) | 3.0 | 1.6 | 1.2 | 1.15 |
| E/B (%) | 390 | 319 | 208 | 226 |

TABLE 3-continued

Influence of the filler content on the adhesive properties of the alkoxy RTV1 formulations

| Fillers (% by weight) | Counter-example 3 | Counter-example 4 | Example 3 according to the invention | Example 1 according to the invention |
|---|---|---|---|---|
| Mechanical properties after treatment in Elf diesel evolution 5W30 oil for 3 d at 150° C. | | | | |
| Shore A hardness | 32 | 19 | 26 | 20 |
| BS (MPa) | 1.56 | 0.8 | 0.86 | 0.74 |
| E/B (%) | 360 | 414 | 222 | 247 |
| Swelling (%) | 6 | 14 | 10 | / |
| Properties of adhesive bondings 1 mm thick in tensile-shear stress on Alu AG3 not contaminated with oil | | | | |
| BS (MPa) | 1.1 | 0.8 | 0.7 | 0.6 |
| Cohesion (%) | 98 | 97 | 93 | 100 |
| Properties of adhesive bondings 1 mm thick in tensile-shear stress on Alu AG3 contaminated with oil | | | | |
| BS (MPa) | 0.6 | 0.5 | 0.7 | 0.6 |
| Cohesion (%) | 0 | 0 | 43 | 83 |

The results show that the addition of a minimum content of ground natural calcium carbonate according to the invention is necessary in order to obtain a cohesive profile on a surface contaminated with engine oil. Thus, only the formulations containing more than 35% by weight of the ground calcium carbonate BLR®3, according to the invention, in the formulation make it possible to obtain cohesion on a surface contaminated with engine oil. The best adhesive properties on a contaminated surface are observed for the formulation containing 40% by weight of BLR®3. The "% by weight" values in table 3 correspond to % by weight values relative to the total weight of the composition.

IV) Catalytic System and Adhesion Promoter

The catalyst-adhesion promoter systems were varied as detailed in the following examples and counterexamples.

Preparation 1

522 g of α-ω-dihydroxylated polydimethylsiloxane oil, containing 0.04% by weight of hydroxyl OH groups, 64 g of a silicone resin containing 1.1% by weight of OH, 172 g of a mixture of polydimethylsiloxane oil comprising trimethylsilyl chain ends, having a viscosity of 100 mPa·s and 1 000 000 mPa·s, and 52 g of vinyltrimethoxysilane are introduced into a mixer equipped with a stirrer of "butterfly" type. This mixture is homogenized by rotating the "butterfly" at 200 rpm for 2 minutes. The functionalization catalyst, 9.5 g of a methanolic solution of lithium hydroxide hydrate, is then added, followed by a phase of homogenizing at 400 rpm. 78 g of fumed silica are then incorporated at a moderate stirring speed of 160 rpm and then dispersed for 4 minutes at 400 rpm. Likewise, 626 g of BLR®3 calcium carbonate are incorporated. After stirring, 4.9 g of a thixotropic additive are added. The medium is then subjected to a phase of degassing under a partial vacuum of 50 mbar and with stirring at 130 rpm.

Example 5 and Counterexamples 5 to 9

Various catalysts and adhesion promoters are added, in the proportions specified in the following table 4, to preparation 1 under an inert atmosphere and are then mixed. The medium is then subjected to a phase of degassing under 40 mbar. The mixture is then transferred into closed plastic cartridges, away from atmospheric moisture. Each formulation is subjected to the evaluation tests described above. The results are given in the following table 4.

TABLE 4

Influence of the nature of the catalyst and of the adhesion promoter on the adhesive properties of the alkoxy RTV1 formulations

| Fillers (% by weight) | Counter-example 5 | Counter-example 7 | Counter-example 8 | Counter-example 6 | Example 5 | Counter-example 9 |
|---|---|---|---|---|---|---|
| Preparation 1 | 98.5 | 98.5 | 98.8 | 98.2 | 99.1 | 99.2 |
| Tyzor ® PITA | | 1 | 1 | | | |
| Tyzor ® PITA SM | 1.5 | | | | | |
| TnBT | | | | 1.44 | | |
| MEMO | | | | 0.36 | | |
| DiCyG A(4) | | | | | 0.3 | |
| TMG | | | | | | 0.3 |
| DAMO | | 0.5 | | | 0.5 | 0.5 |
| AEMO | | | 0.23 | | | |
| Mechanical properties after 7 d of crosslinking at 23° C. +/− 2 and 50% RH +/− 5 | | | | | | |
| Shore A hardness | 28-30 | 21 | 23 | not measured | 33 | No cross-linking |
| Mechanical properties after treatment in 5W30 oil | | | | | | |
| Shore A hardness | 0 | 1 | 6 | not measured | 22 | not measured |
| Properties of adhesive bondings on Alu AG3 contaminated with oil | | | | | | |
| BS (MPa) | 0.3 | 0.2 | 0.3 | 0.6 | 0.75 | not measured |
| Cohesion (%) | 0 | 0 | 0 | 10 | 100 | not measured |

The formulation comprising the catalyst N,N-dicyclohexyl-N'-methyl-N''-butylguanidine A(4) or DiCyG (example 5) in combination with the calcium carbonate according to the invention and with a polyalkoxysilane having at least one group comprising at least one nitrogen atom exhibits a satisfactory hardness after treatment in the oil, and good adhesion on a contaminated surface. The tests carried out with the N,N-dicyclohexyl-N'-methyl-N''-butylguanidine A(4) being replaced with the guanidines A(1) to A(3) and A(5) to A(9) described above show similar results.

The results of table 4 show that the formulations containing a titanium catalyst (counterexamples 5 to 8 with Tyzor® PITA or TnBT) make it possible to obtain elastomers with acceptable mechanical properties after 7 days of crosslinking, but their resistance to the oil and also the adhesion to a contaminated surface are not in accordance with the desired application, whatever the polyalkoxysilane used (MEMO, DAMO or AMEO).

When the guanidine catalyst according to the invention is replaced with tetramethylguanidine (TMG-counterexample 9), which is a guanidine that has an unsubstituted imine function, i.e. of >C=N—H type, the elastomer does not crosslink sufficiently to be able to measure a hardness, which is totally unacceptable for the application.

The invention claimed is:

1. A polyorganosiloxane composition X which can be crosslinked to give an elastomer in the presence of water via a polycondensation reaction, comprising:
   A) at least one polyorganosiloxane A comprising at least one alkoxylated group and composed of identical or different siloxyl units, of formula:

$(Z)_b(R^4)_a SiO_{[4-(a+b)]/2}$ (1)

in which:
   the symbol $Z=[-(OCH_2CH_2)_c-OR^5]$, with c=0 or 1,
   a=0, 1, 2 or 3; b=0, 1, 2 or 3, a+b=0, 1, 2 or 3,
   the symbol $R^4$ represents a monovalent $C_1$ to $C_{13}$ hydrocarbon-based radical,
   the symbol $R^5$ represents a monovalent $C_1$ to $C_6$ hydrocarbon-based radical or an alkoxyalkyl radical optionally comprising an ester function, and
   with the condition that, for at least one siloxyl unit, the index b≥1, such that the polyorganosiloxane A contains at least one alkoxylated group Z,
   B) an amount strictly greater than 35% by weight, relative to the total amount of the composition, of at least one ground natural calcium carbonate B which has a specific surface area strictly less than 3 $m^2/g$, measured according to the BET method, and which has been surface-treated with at least one compound selected from the group consisting of: a paraffin, a fatty acid, a fatty acid salt, and a mixture thereof,
   C) a catalytically effective amount of at least one condensation catalyst C which is a guanidine that has an imine function substituted with an atom other than a hydrogen atom corresponding to formula (I) or (II):

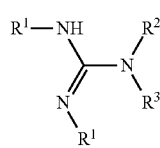

(I)

in which:
   the $R^1$ radicals, which may be identical or different, represent, independently of one another, a linear or branched monovalent alkyl group, a cycloalkyl group, a (cycloalkyl)alkyl group, the ring being substituted or unsubstituted and possibly comprising at least one heteroatom, or a fluoroalkyl group,
   the $R^2$ radical represents a hydrogen atom, a linear or branched monovalent alkyl group, a cycloalkyl group, an alkyl group substituted with a ring, which is substituted or unsubstituted and which can comprise at least one heteroatom, an aromatic group, an arylalkyl group, a fluoroalkyl group, an alkylamine group or an alkylguanidine group, and
   the $R^3$ radical represents a linear or branched monovalent alkyl group, a cycloalkyl group, an alkyl group substituted with a ring, which is substituted or unsubstituted and which can comprise at least one heteroatom, or an arylalkyl, fluoroalkyl, alkylamine or alkylguanidine group, and
   when the $R^2$ radical is not a hydrogen atom, the $R^2$ and $R^3$ radicals can be linked up to form a 3-, 4-, 5-, 6- or 7-membered aliphatic ring optionally substituted with one or more substituents,

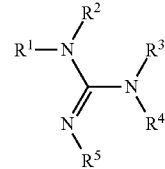

(II)

in which:
   the $R^1$, $R^2$, $R^3$, $R^4$ or $R^5$ radicals, which may be identical or different, represent, independent of one another, a linear or branched monovalent alkyl group, a cycloalkyl group, a (cycloalkyl)alkyl group, the ring being substituted or unsubstituted and optionally comprising at least one heteroatom or a fluoroalkyl group, an aromatic group, an arylalkyl group, a fluoroalkyl group, an alkylamine group or an alkylguanidine group, and
   the $R^1$, $R^2$, $R^3$ or $R^4$ radicals can be linked up in pairs so as to form a 3-, 4-, 5-, 6- or 7-membered aliphatic ring optionally substituted with one or more substituents,
   D) at least one polyalkoxysilane D that has at least one group comprising at least one nitrogen atom,
   E) optionally at least one filler E other than said ground natural calcium carbonate B,
   F) optionally at least one additive F, such as a coloring base, a pigment or a thixotropic agent, and
   with the additional condition that said polyorganosiloxane composition X does not contain acetylene black.

2. The polyorganosiloxane composition X as claimed in claim 1, wherein the ground natural calcium carbonate B has a specific surface area strictly less than 3 $m^2/g$, measured according to the BET method, and has been surface-treated with at least one fatty acid containing from 10 to 24 carbon atoms or one or more respective salt thereof chosen from calcium, magnesium and/or zinc salts, and/or a mixture thereof.

3. The polyorganosiloxane composition X as claimed in claim 1, wherein the crosslinkable polyorganosiloxane A is linear and has the expanded formula:

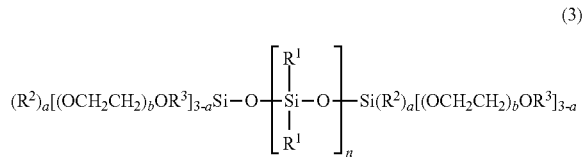

in which:
- the substituents $R^1$, which may be identical or different, each represent a saturated or unsaturated monovalent $C_1$ to $C_{13}$ hydrocarbon-based radical which is substituted or unsubstituted and aliphatic, cyclanic or aromatic;
- the substituents $R^2$, which may be identical or different, each represent a saturated or unsaturated monovalent $C_1$ to $C_{13}$ hydrocarbon-based radical which is substituted or unsubstituted and aliphatic, cyclanic or aromatic;
- the substituents $R^3$, which may be identical or different, each represent a linear or branched $C_1$ to $C_6$ alkyl radical;
- n has a value sufficient to confer, on the polyorganopolysiloxane of formula A, a dynamic viscosity at 25° C. ranging from 1 000 to 1 000 000 mPa·s; and
- the index a is equal to zero or 1 and the index b is equal to zero or 1.

4. The polyorganosiloxane composition X as claimed in claim 1, wherein the polyorganosiloxane A comprising at least one alkoxylated group is obtained by reacting, optionally in situ, in the presence of a catalytically effective amount of at least one functionalization catalyst G:
a) at least one polyorganosiloxane A' comprising siloxyl units of formula:

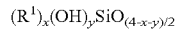

in which:
- x+y=0, 1, 2 or 3;
- the substituents $R^1$, which can be identical or different, each represent a monovalent $C_1$ to $C_{13}$ hydrocarbon-based radical chosen from the group consisting of alkyl, cycloalkyl, aryl, alkaryl and aralkyl radicals, and
- at least two siloxyl units comprising an ≡SiOH group are present in the polyorganosiloxane A', with b) at least one polyalkoxylated silane H of formula:

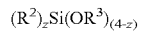

in which:
- z=0 or 1,
- the symbol $R^2$ represents a monovalent $C_1$ to $C_{13}$ hydrocarbon-based radical, and
- the symbols $R^3$ which may be identical or different, each represent a monovalent $C_1$ to $C_6$ hydrocarbon-based radical or an alkoxyalkyl radical optionally having an ester function.

5. The polyorganosiloxane composition X as claimed in claim 4, wherein the functionalization catalyst G is lithium hydroxide or potassium hydroxide.

6. The polyorganosiloxane composition X as claimed in claim 4, wherein the at least one polyorganosiloxane A' is an α,ω-dihydroxypolydiorganosiloxane polymer with a viscosity between 50 and 5,000,000 mPa·s at 25° C.

7. The polyorganosiloxane composition X as claimed in claim 4, wherein the at least one polyalkoxylated silane H is selected from the group consisting of $Si(OCH_3)_4$, $Si(OCH_2CH_3)_4$, $Si(OCH_2CH_2CH_3)_4$, $(CH_3O)_3SiCH_3$, $(C_2H_5O)_3SiCH_3$, $(CH_3O)_3Si(CH=CH_2)$, $(C_2H_5O)_3Si(CH=CH_2)$, $(CH_3O)_3Si(CH_2-CH=CH_2)$, $(CH_3O)_3Si[CH_2-(CH_3)C=CH_2]$, $(C_2H_5O)_3Si(OCH_3)$, $Si(OCH_2-CH_2-OCH_3)_4$, $CH_3Si(OCH_2-CH_2-OCH_3)_3$, $(CH_2=CH)Si(OCH_2CH_2OCH_3)_3$, $C_6H_5Si(OCH_3)_3$, $C_6H_5Si(OCH_2-CH_2-OCH_3)_3$, 3-glycidoxypropyltrimethoxysilane (GLYMO), and methacryloxypropyltrimethoxysilane (MEMO).

8. The polyorganosiloxane composition X as claimed in claim 1, wherein the condensation catalyst C is a guanidine corresponding to formula (I):

9. The polyorganosiloxane composition X as claimed in claim 1, wherein the condensation catalyst C is a guanidine of formula (II):

10. An elastomer obtained by crosslinking, in the presence of water, of the polyorganosiloxane composition X as defined in claim 1.

11. A polyorganosiloxane composition X as defined in claim 1 and/or an elastomer obtained by crosslinking, in the presence of water thereof, capable of being used for preparing a silicone gasket having good adhesion on surfaces contaminated with one or more oils of a power train.

12. A process for sealing and assembling at least one component of a power train, comprising the following a) to d):
a) preparing a polyorganosiloxane composition X as defined in claim 1,
b) applying said polyorganosiloxane composition X to at least one contact region of said component, continuously and/or noncontinuously and optionally in the form of a bead,
c) allowing said polyorganosiloxane composition X to crosslink to form a silicone elastomer in the presence of moisture provided by ambient air and/or by prior addition of water, so as to form a gasket, and
d) assembling said component with another component of the power train such that the seal formed provides for assembly and the sealing between the two components.

13. The polyorganosiloxane composition X as claimed in claim 1, wherein the ground natural calcium carbonate B is prepared from the group consisting of chalk, calcite, marble, or a mixture thereof.

14. The polyorganosiloxane composition X as claimed in claim 1, wherein the ground natural calcium carbonate B is between 37 and 50 parts by weight, relative to the total weight of the composition.

15. The polyorganosiloxane composition X as claimed in claim 1, wherein the at least one polyalkoxysilane D is of formula:

$$(R^5)_z Si(OR^4)_{(4-z)} \qquad (6)$$

wherein
- z is 1 or 2,
- $R^5$ represents a group or radical comprising at least one nitrogen atom, and
- each $R^4$, which may be identical or different, represents a monovalent $C_1$ to $C_6$ hydrocarbon-based radical or an alkoxyalkyl radical optionally having an ester function.

16. The polyorganosiloxane composition X as claimed in claim 1, wherein the wherein the at least one polyalkoxysilane D is selected from the group consisting of [H₂N(CH₂)₃]Si(OCH₂CH₂CH₃)₃, [H₂N(CH₂)₃]Si(OCH₃)₃, [H₂N(CH₂)₃]Si(OC₂H₅)₃, [H₂N(CH₂)₄]Si(OCH₃)₃, [H₂NCH₂CH(CH₃)CH₂CH₂]SiCH₃(OCH₃)₂, [H₂NCH₂]Si(OCH₃)₃, [n-C₄H₉—HN—CH₂]Si(OCH₃)₃, [H₂N(CH₂)₂NH(CH₂)₃]Si(OCH₃)₃, [H₂N(CH₂)₂NH(CH₂)₃]Si(OCH₂CH₂OCH₃)₃, [CH₃NH(CH₂)₂NH(CH₂)₃]Si(OCH₃)₃, [H(NHCH₂CH₂)₂NH(CH₂)₃]Si(OCH₃)₃, NH₂CONH₂(CH₂)₃Si(OCH₃)₃,

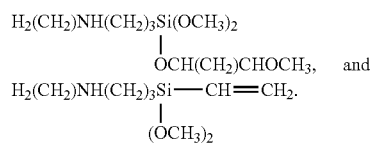

and

17. The polyorganosiloxane composition X as claimed in claim 1, wherein the polyalkoxysilane D is between 0.1 and 5 parts by weight, relative to the total weight of the composition.

18. The polyorganosiloxane composition X as claimed in claim 1, wherein the condensation catalyst C is between 0.1 and 5 parts by weight, relative to the total weight of the composition.

19. The polyorganosiloxane composition X as claimed in claim 1, wherein the condensation catalyst C is between 0.1 and 1 part by weight, relative to the total weight of the composition.

20. The polyorganosiloxane composition X as claimed in claim 1, wherein the condensation catalyst C is selected from the group consisting of (A1) to (A9), as shown below:

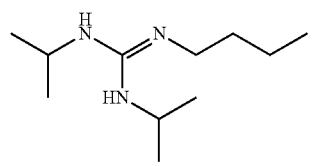
(A1)

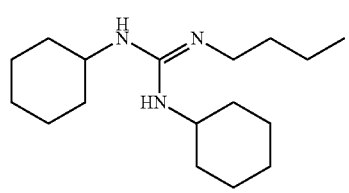
(A2)

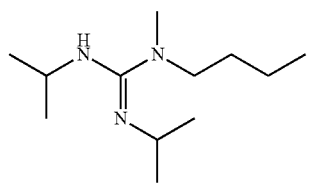
(A3)

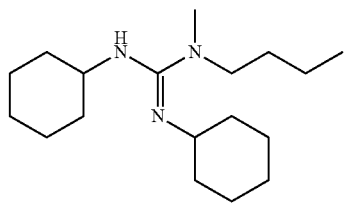
(A4)

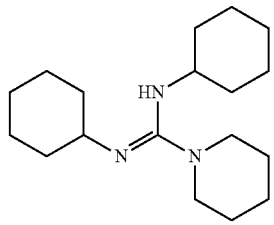
(A5)

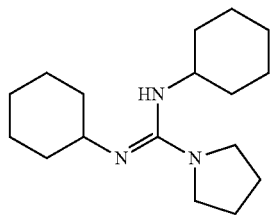
(A6)

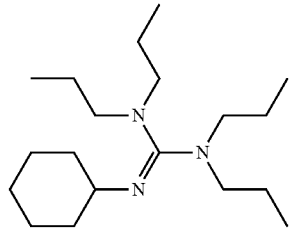
(A7)

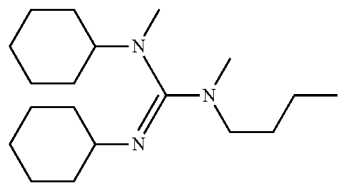
(A8)

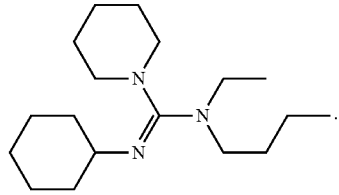
(A9)

21. The polyorganosiloxane composition X as claimed in claim 1, wherein the ground natural calcium carbonate B has a specific surface area strictly less than 3 m²/g, measured according to the BET method, and has been surface-treated been surface-treated with stearic acid and/or a respective calcium, magnesium and/or zinc salt thereof.

* * * * *